3,057,903
STABILIZATION OF FORMALDEHYDE
CYANOHYDRIN
Joseph W. Nemec, Rydal, and Charles H. McKeever, Meadowbrook, Pa., assignors to Rohm & Haas Company, Philadelphia, Pa., a corporation of Delaware
No Drawing. Filed Nov. 6, 1959, Ser. No. 851,232
5 Claims. (Cl. 260—465.6)

This invention relates to the stabilization of formaldehyde cyanohydrin and particularly to a stabilization procedure which is safe, effective, and commercially advantageous.

Formaldehyde cyanohydrin (glycolonitrile) may be obtained from the reaction of formaldehyde and hydrogen cyanide, from the interaction of formaldehyde and an alkali cyanide or by cyanohydrin interchange. Regardless of the method of preparation, formaldehyde cyanohydrin is characterized by varying degrees of instability which is, of course, highly undesirable and frequently dangerous.

Formaldehyde cyanohydrin is a reactive compound which has been found to be useful in various chemical synthesis as for example in the manufacture of such materials as ethylenediamine tetraacetic acid, N-substituted sarcosinates, glycine and ethylenediamine. However, formaldehyde cyanohydrin, as heretofore produced, is unstable and, therefore, commercial utilization of this material has not been generally developed because of this instability, which manifests itself both during purification and storage. The material has a pronounced tendency to decompose at the higher temperatures required for its purification, even though reduced pressures are used so that minimal temperatures are employed. Addition of acids, such as sulfuric acid or phosphoric acid, has been previously employed to impart stability to aqueous solutions of formaldehyde cyanohydrin. This procedure is not completely satisfactory since it has been observed that serious decomposition of such stabilized aqueous solutions has occurred on storage, particularly those of higher concentration and especially those containing about 90% and above of the formaldehyde cyanohydrin. Also, because addition of acidic material imparts only limited stability, the yields of purified product are decreased by the degradation losses during distillation or concentration. Other additives that have been employed to impart stability to formaldehyde cyanohydrin include ethanol, phthalic anhydride, iodine, and monochloroacetic acid. These stabilizing agents have not been entirely satisfactory as is attested to by the fact that pure formaldehyde cyanohydrin is unknown as a commercial product and that it is marketed solely as an aqueous solution not exceeding 75% formaldehyde cyanohydrin.

The present invention comprises the treatment of the reaction produce of hydrogen cyanide and formaldehyde, which reaction results in essentially quantitative conversions to formaldehyde cyanohydrin, with the acid form of a cation-exchange resin. This gives a product which has excellent stability. With the use of commercial aqueous 37% formaldehyde and hydrogen cyanide, formaldehyde cyanohydrin is obtained as an approximately aqueous 50% formaldehyde cyanohydrin solution. It is often necessary or at least highly desirable to use either anhydrous or highly concentrated formaldehyde cyanohydrin in subsequent reactions. This resin-treated material may be distilled or concentrated with no degradation during such operations. In addition, the resulting materials, that is, either the highly concentrated material or anhydrous formaldehyde cyanohydrin have excellent stability without the addition of stabilizers.

It is an object of the present invention to provide a method for the stabilization of formaldehyde cyanohydrin. A further object is to provide a method for the safe and practicable purification of formaldehyde cyanohydrin. Another object is to provide formaldehyde cyanohydrin either in a highly concentrated form or as the anhydrous material which in either case exhibits excellent storage stability. An additional object is to provide stable concentrated or anhydrous formaldehyde cyanohydrin in high yield which has substantial commercial significance. Furthermore, since the method of the present invention does not involve the addition of a stabilizing material, a further object is to provide a stable material which does not contain any contaminants, particularly strong acids. Further objects and advantages of the present invention will be apparent hereinafter.

The present invention deals with the treatment of an aqueous formaldehyde cyanohydrin reaction system with the acidic form of a cation-exchange resin. The preferred process is based on a continuous operation in which aqueous formaldehyde cyanohydrin (i.e. the reactor effluent containing about 50% formaldehyde cyanohydrin produced by the reaction between hydrogen cyanide and aqueous 37% formaldehyde) is gravity fed through a column containing the resin and the stabilized material is obtained at the bottom of the unit. This invention, however, is not limited to this type of operation since batch treatment of the formaldehyde cyanohydrin with the acid form of the resin gives equivalent results. In this case, the resin may be added to the solution in a reactor, the components thoroughly mixed and then separated, such as by filtration or decantation. Combinations of the above continuous and batch methods, as well as other contacting procedures, fall within the scope of the present invention.

The stabilized material may be stored for extended periods of time with no observable degradation or may be concentrated or distilled to give essentially complete recovery of the formaldehyde cyanohydrin as a stable concentrated solution or as stable anhydrous formaldehyde cyanohydrin.

Other stabilizing procedures require neutralization of materials which react with the stablizer or the use of sufficient excess of the stabilizer over that which is inactivated by contaminants in the crude formaldehyde cyanohydrin. Thus, for example, when iodine is employed as the stabilizer and if the cyanohydrin contains alkali or another basic material (frequently or normally employed as the catalyst to effect the reaction of hydrogen cyanide with formaldehyde) as an impurity it is necessary to either neutralize the impure cyanohydrin with an acid prior to the addition of the iodine or to add excess iodine to allow for that portion which reacts with the basic impurity. Similarly, with the use of acidic stabilizers, excess acid must be added to first neutralize the basic impurity and then to render the environment strongly acidic. With the method of the present invention, however, no such additional measures are required since the impurities which cause instability are removed completely by the resin treatment. Acidity is not the whole story, since formaldehyde cyanohydrin systems that have been acidified by the addition of acidic agents, as shown in the prior art, still exhibit varying degrees of undesirable instability.

Various cation-exchange resins may be employed in the process of the present invention, such as those containing sulfonic acid groups, carboxylic acid groups, both sulfonic and carboxylic acid groups, phosphonic acid groups, and both sulfonic and phosphonic acid groups. It is preferred to employ cation-exchange resins containing sulfonic acid groups. The chemical constituency and process for preparation of these cation-exchange resins are well understood by those skilled in the art and these resins are available commercially. For instance, sulfonated exchange resins that may be used can be prepared by the condensation of phenolic sulfonic acids with formaldehyde or by the sulfonation of copolymers of styrene. It is also satisfactory to employ sulfonated coal. There also may be used carboxylic exchange resins, such as those prepared by the copolymerization of a polymerizable acid, such as acrylic acid or methacrylic acid with a divinyl compound, such as divinyl benzene. The important consideration is that an ion-exchange resin of the cationic type be employed and that the resin be in its hydrogen form.

The preferred process of the present invention involves the flow by gravity of the crude formaldehyde cyanohydrin reactor effluent through a tube containing the cation-exchange resin. It has been observed with a number of samples that the pH of the effluent from the column correlates with the stability of the formaldehyde cyanohydrin. Maximum stability results when the pH is about 2 or below and should not exceed a pH of about 4. The preferred method of operation involves the flow of the solution through the ion-exchange column until the pH of the effluent is about 2.5. At this point, the flow is stopped (or directed to a fresh column) and the spent column is regenerated according to methods known to those skilled in the art.

The above conditions are particularly applicable when employing the sulfonic acid resins. With the use of the carboxylic type resins (weaker acids than the sulfonic type), the control points are in the range of pH 3 to 4. However, as previously indicated, the use of these resins provides only limited stability, usually for a period of up to about 6 months.

Usually, unstabilized material degrades, often violently, within 24 hours. No apparent degradation has been observed over a period of more than one year with samples of aqueous about 50 to 60% formaldehyde cyanohydrin which had been subjected to the treatment with the sulfonic acid resin. Samples of the resin-stabilized aqueous 50 to 60% formaldehyde cyanohydrin solutions have been distilled with no apparent decomposition and samples of the distillate (with no additional treatment) have been stored unchanged for over one year. Similar stability is characteristic of the anhydrous formaldehyde cyanohydrin obtained from the cation-exchange resin treatment of this invention and subsequent dehydration. The storage times cited do not represent the maximum storage stability since all samples remained unchanged after these periods.

The present invention may be more fully understood from the following examples that are offered by way of illustration and not by way of limitation.

*Example 1*

The product from the reaction of hydrogen cyanide and aqueous 37% formaldehyde containing aqueous 52.3% formaldehyde cyanohydrin has a pH of 4.6. This material is passed down through about 250 cc. of water-wet sulfonated cation-exchange resin in hydrogen form (Amberlite XE-77) contained in a 1" x 15" column at a rate of about 15 cc. per minute. The product is collected until the pH of the effluent increases above pH 2.2. At this time, the crude material is transferred to a fresh column. Normally, one volume of fresh resin is adequate to provide 15 to 25 volumes of stabilized aqueous formaldehyde cyanohydrin.

The sample of stabilized aqueous 52% formaldehyde cyanohydrin exhibits complete stability after over one year at 70° to 80° F.

Samples of the stabilized aqueous 52% formaldehyde cyanohydrin were continuously distilled to provide from the still bottoms concentrated (90 to 95%) formaldehyde cyanohydrin and this product remained completely stable for periods up to at least one year without any further treatment. Also, the concentrated solutions are distilled to provide essentially pure formaldehyde cyanohydrin. Again, with no additional treatment, this material when stored at room temperature for one year remains completely stable.

Similar results are obtained when cation-exchange resins in hydrogen form that contain phosphonic acid groups or both sulfonic and phosphonic acid groups are employed.

*Example 2*

A one liter sample of aqueous 51.7% formaldehyde cyanohydrin prepared from hydrogen cyanide and formaldehyde is passed through a 1" x 15" glass column containing about 250 cc. of a carboxylic type cation-exchange resin in its hydrogen form (Amberlite XE-89). The flow rate is regulated to about 10 cc. per minute. The effluent from the column has a pH of 3.1 and remains completely stable when stored at 70° to 80° F. for a period of 22 weeks.

Similar results are obtained by using a resin in hydrogen form containing both carboxylic and sulfonic acid groups.

We claim:

1. A method for the stabilization of formaldehyde cyanohydrin which consist of treating an aqueous formaldehyde, cyanohydrin reaction system comprising formaldehyde cyanohydrin made from the reaction of hydrogen cyanide and aqueous formaldehyde with a cation-exchange resin in hydrogen form until said reaction system has a pH of up to 4.

2. A method for the stabilization of formaldehyde cyanohydrin which consists of passing an aqueous formaldehyde cyanohydrin reaction system comprising formaldehyde cyanohydrin made from the reaction of hydrogen cyanide and aqueous formaldehyde through a bed of cation-exchange resin in its hydrogen form until the effluent has a pH of up to 4.

3. A method for the stabilization of aqqueous formaldehyde cyanohydrin which consists of treating an aqueous formaldehyde cyanohydrin reaction system made from the reaction of hydrogen cyanide and aqueous formaldehyde comprising about 50 to 60% of formaldehyde cyanohydrin with a cation-exchange resin in its hydrogen form until the pH in said system is about 2 to 4.

4. A method according to claim 1 in which said resin contains sulfonic acid groups.

5. A method for the stabilization of formaldehyde cyanohydrin which consists of treating formaldehyde cyanohydrin with a cation-exchange resin in hydrogen form until said formaldehyde cyanohydrin has a pH of about 2 to 4.

References Cited in the file of this patent
UNITED STATES PATENTS

| | | |
|---|---|---|
| 2,416,624 | Hansley | Feb. 25, 1947 |
| 2,444,589 | Blann | July 6, 1948 |
| 2,623,896 | Beier | Dec. 30, 1952 |
| 2,653,162 | Luskin | Sept. 22, 1953 |